United States Patent [19]

Bersin et al.

[11] 3,879,597

[45] Apr. 22, 1975

[54] PLASMA ETCHING DEVICE AND PROCESS

[75] Inventors: Richard L. Bersin, Kensington; Michael J. Singleton, Hayward, both of Calif.

[73] Assignee: International Plasma Corporation, Hayward, Calif.

[22] Filed: Aug. 16, 1974

[21] Appl. No.: 498,100

[52] U.S. Cl. .......................... 219/121 P; 204/129.3

[51] Int. Cl. .......................... B23k 9/00

[58] Field of Search .................... 219/121 P, 24, 75; 313/231.3, 231; 204/129.1, 129.3

[56] References Cited

UNITED STATES PATENTS

| | | | |
|---|---|---|---|
| 3,601,578 | 8/1971 | Gebel et al. | 219/121 P |
| 3,677,326 | 7/1972 | Grosse | 219/121 P X |
| 3,764,272 | 10/1973 | Sterling | 219/121 P X |

*Primary Examiner*—J. V. Truhe
*Assistant Examiner*—G. R. Peterson
*Attorney, Agent, or Firm*—Warren, Rubin & Chickering

[57] ABSTRACT

There is disclosed a device for plasma etching which includes a quartz cylinder surrounded by a coil of electrodes connected to a source of radio frequency energy, and having within it a concentric cylinder or perforated aluminum or other electrically conductive metal.

6 Claims, 1 Drawing Figure

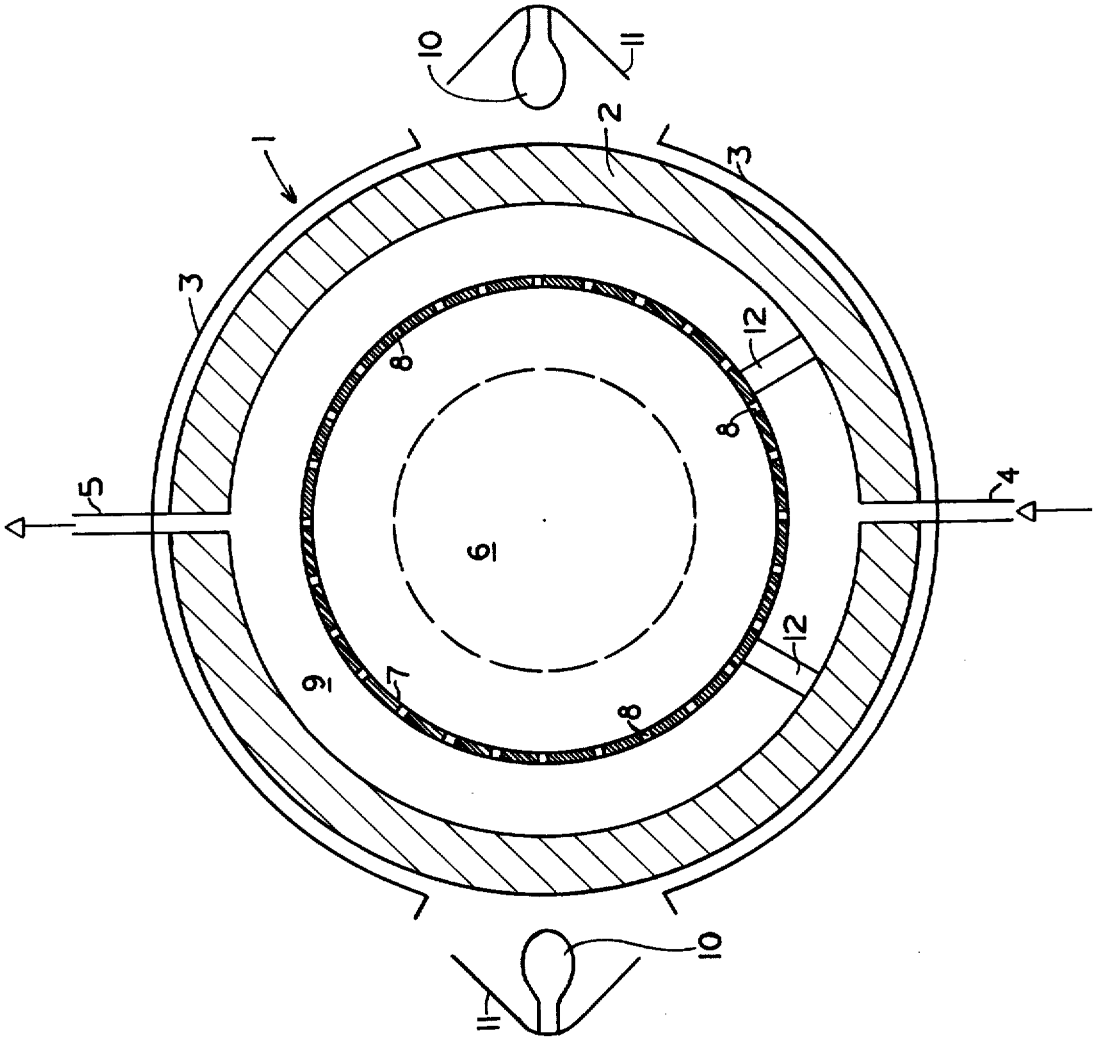

PLASMA ETCHING DEVICE AND PROCESS

BACKGROUND OF THE INVENTION

Etching surfaces of materials has long been a useful process. It is accomplished by coating all portions of the surface except those to be etched with a material that resists attack by the etchant, and then subjecting the entire article to contact with the etchant. After the surface has been etched sufficiently, it is removed from contact with the etchant; and the resistant material is then removed to produce a surface that is partially unetched. Resistant materials are called resists. When difficult patterns are to be etched, a photoresist is used. By conventional photographic techniques, the photoresist can be removed in intricate patterns with high resolution. Etching surfaces with intricate patterns having high resolution has become an important industrial process for producing small electronic components which are known as chips.

One process for producing chips involves etching of silicon wafers by placing a resist on their surface with photographic techniques and then subjecting the silicon to a plasma. Plasma is made by subjecting gas at low pressure to radio frequency voltage. Etching is accomplished by placing the gas at low pressure in a quartz cylinder surrounded by a source of radio frequency power, such as a coil or a number of electrodes, and then energizing the coil or electrode with high voltage at radio frequency. The production of a plasma is indicated by a bright glow within the quartz cylinder.

Plasmas contain highly active but difficult-to-identify species. For example, a plasma of a very inert gas such as a fluorocarbon, known commercially as Freon, will etch glass, indicating that an active fluorine species is present in the plasma. In addition to the active chemical species, there are strong radiations, such as ultraviolet, and strong ion and electron bombardment of the surfaces within the plasma. The radiation and the bombardment produces some unwanted effects. For example, radiation causes heat, which in turn causes the photoresist to be attacked by the plasma. Ion bombardment causes the photoresist to be toughened so that subsequent removal, either by physical or chemical means, is difficult.

The attack on the photoresist limits the duration of a plasma etching process, and accordingly it limits the thickness of the material that may be removed. Using thicker layers of resist only partly solves the problem because the attack is most pronounded at the edge of the resist. Thus, a thick layer of resist may prevent etching of the major portion of the protected surface, but long term etching processes cannot successfully produce patterns with high resolution. Accordingly, it is important to etch quickly or, alternatively, to etch by a process that doesn't destroy any resist. Commercially it is always important to etch quickly in order to increase the productivity of a given device.

Another important consideration in an etching process is the uniformity of the surface that is etched. In a typical etching process, a group of wafers of the materials to be etched are spaced closely from each other and positioned concentrically in a cylindrical etching chamber. The wafers are then subjected to plasma. The etching process begins at the edges of the wafers and proceeds toward the centers, and in almost all cases the edges of the wafers are etched more deeply than the center. In addition, the photoresist is most strongly attacked at the edges so that undercutting and poor resolution are more pronounced toward the edges than toward the centers. Uniformity of etching across a wafer is important and it usually is obtained by using slower etching rates which cause less attack on the resist, and by using greater spacing between the wafers. Both of these measures reduce the productivity of a given device; and even when those measures are taken, uniformity is rare and its absence is simply endured.

THE INVENTION

This invention either overcomes or greatly mitigates the above enumerated problems. This invention includes a device for etching with plasma which is made in the usual way, including a cylinder made of a nonmetallic inorganic material, such as quartz, and having a rear wall and a front opening. The front opening is provided with a seal to permit evacuating the cylinder to very low pressures, and the cylinder is connected to an evacuation system and to a source of gas from which plasma is to be made.

The inorganic cylinder is further surrounded with conventional electrical systems for generating a plasma. These are either a group of electrodes or a coil connected to a source of radio frequency at high voltage.

In accordance with this invention, a perforated cylinder of an electrically conductive metal is maintained concentric to and within the inorganic cylinder constituting the chamber in which the plasma is generated. The perforated metal preferably is aluminum, and it is spaced from the wall of the inorganic cylinder and concentric to it.

The operation of the device of this invention includes placing the material to be etched within the perforated cylinder, evacuating the device in the usual way, bleeding the plasma gas into the device in the usual way, and applying high voltage radio frequency in the usual way. The result of the process, however, is very unusual and unexpected. First, it is observed that the glowing material that usually fills the entire plasma chamber is confined to the space between the perforated cylinder and the inorganic cylinder. The volume within the perforated cylinder is a dark tunnel.

The etching process proceeds in the dark tunnel at the usual rate, but the photoresist is not attacked at all. When measures are taken to increase the etching rate, such as increasing the energy that is used or increasing the pressure of the etchant gas, the rate of etching increases correspondingly, but the photoresist still remains virtually unattacked. Using the present invention, it has been found that etching times can be halved without discernible attack on resist. This invention also permits the use of plasma etching where it was not previously possible: specifically, to etch materials that are so thick or so resistant to etching that a photoresist could not endure through an etching process that is long enough or intense enough to remove the same amount of material employing prior art devices. Also, surprisingly, in the device of this invention a high degree of uniformity across the surface of wafers being etched is obtained, even though those wafers are closely spaced.

The perforated cylinder of this invention may be of any highly electrically conductive metal, such as aluminum, copper, silver, or the like; but aluminum is preferred because it is chemically inert to fluorine-containing plasmas and is inexpensive and readily available. Other electrically conductive metals will normally be used only in situations where aluminum would be attacked by the plasma. The perforations may be relatively large. For example, an aluminum house screen bent into a cylinder is adequate. It is preferred for structural reasons that the perforated metal cylinder be a light gauge sheet that is punched with evenly and closely spaced holes. Holes about one-eighth inch in diameter, spaced about three-eighths inch on centers, have been found to be adequate.

Although it is not known, it is thought that the perforated cylinder in the device of this invention acts as a screen for radiations, electrons, ions, and high temperatures; while it is entirely pervious to the active chemical species that cause etching. The toughening of the photoresist that is so prevalent in conventional plasma etching processes is absent in the process effected in the device of this invention. In addition, it is observed that the photoresist withstands even pure oxygen plasma in the device of this invention unless the wafers are heated, for example, by an infrared lamp. When the wafers are heated from an external source, the resist is quickly removed by even small quantities of oxygen in the plasma. It is accordingly an embodiment of this invention to provide an external heat source to the interior of the perforated cylinder. The word external is used in the sense that it is not caused by generating of plasma or radiation resulting from it.

DETAILED DESCRIPTION

In order to better understand the present invention, it will be explained with reference to the accompanying drawing which is a schematic representation in a cross section of an elevation view of a device embodying this invention.

The device, which is generally designated 1, includes a cylindrical chamber 2 which is made of an inorganic material such as quartz. Surrounding the chamber 2 are electrodes 3 which may either be a single coil or a number of grounded electrodes. The electrodes 3 are connected to a source of electrical energy at radio frequencies and in any suitable circuit known to the art. The cylindrical chamber 2 is also provided with a gas inlet 4 and a gas outlet 5, which is connected to suitable equipment for evacuating the chamber 2. A cylinder of electrically conductive metal 7 is maintained within the chamber 2. The cylinder 7 contains perforations 8 and is supported, preferably by legs 12, to occupy a position coaxial with the chamber 2. Conventional means, not shown, are employed within the cylinder 7 to maintain material to be etched — shown as 6 in broken line representation. The material to be etched does not form part of this invention and is illustrated only to show positional relationships. Conventional racks are employed for holding the material to be etched, which is usually in the form of the wafers, spaced from one another, upright and coaxial with the chamber 2.

A particularly beneficial embodiment of this invention employs an external heat source illustrated as an infrared lamp 10 with a reflector 11 that is positioned to supply heat by radiation to the wafer 6, so that stripping a photoresist may be effected after etching is completed without dismantling the apparatus. The remaining portions of the apparatus are all conventional, and they include a rear wall and a sealable front opening so that the chamber 2 may be evacuated. It is essential that annular space 9 be maintained between the chamber 2 and the perforated cylinder 7 because the active species that effect etching are generated in this annular space.

In general, the device of this invention is employed by positioning one or more wafers 6 in a suitable rack and then placing the rack within the cylinder 7 so that it is evenly spaced between the front and rear walls of the chamber 2 and approximately coaxial with the chamber 2. The wafers to be etched will normally be spaced about three-sixteenths inch apart and standing approximately vertically. When the wafers are positioned within the chamber 2, the front opening is closed and the chamber 2 is evacuated to very low pressures. It is generally desirable to bleed some of the plasma-producing gas into the chamber and to evacuate it again so that, by dilution, air is removed almost completely. When a suitable atmosphere is obtained within the chamber 2, the pressure is adjusted, preferably by the maintainance of a dynamic pressure that is maintained by bleeding a small amount of gas into the chamber via line 4 while evacuating the gas from the chamber via line 5, after which radio frequency voltage at suitable power is applied to the electrodes 3.

When electric power is supplied to electrodes 3, a brilliant glow appears in the annular space 9. However, the interior of the cylinder 7 remains dark. The glow in annular space 9 indicates that plasma is being generated as well as ions, electrons, and radiations; and the generation of plasma is continued until sufficient etching has been accomplished on the wafer 6. At that point, the etching process is completed and the wafers may be removed from the interior of cylinder 7. If the wafers are removed at this point in the process, it is necessary to treat them to remove photoresist.

A particularly beneficial embodiment of this invention is involved wherein, when etching is completed, the wafers 6 are heated by radiations from infrared lamps 10. Since most etching processes evolve oxygen and since most etching gases include some oxygen, the heated wafer quickly responds to the oxygen-containing plasma; and the resist oxidizes and is removed cleanly and completely from the wafer in a very short time. When insufficient oxygen is present in the plasma to effect removal of the resist, additional quantities of oxygen may be bled in through line 4 for the rapidly-effected process of oxidizing the resist. When this embodiment is employed, the wafers are complete when removed from the plasma-treating zone.

A number of tests were performed to demonstrate the present invention, which are set forth in the following examples.

EXAMPLE 1

A number of 2 inch diameter wafers of phosphorus-doped glass were prepared with patterns of photoresist 5,000 angstrom units thick. In all cases the etching process was effected to remove phosphorus glass to a depth of 5,000 angstrom units. The wafers were placed in an 8 inch diameter chamber which was evacuated and operated as described above, employing a gas consisting of tetrafluoro methane containing 4%v oxygen. The same chamber was used in all tests; however, in those tests designated "tunnel" a perforated aluminum cylinder was employed in accordance with this invention, while in those tests designated "open chamber" no perforated aluminum cylinder was employed. Open chamber tests employ plasma-generating apparatus of the prior art.

Since attack on the silicon wafer by the plasma generates heat which in turn quickly destroys the photoresist, some of the wafers employed in the open chamber were backed with an aluminum plate to shield the wafers from the plasma on the backside, and some wafers were in unbacked condition. All of the wafers in the tunnel were in unbacked condition. Table I sets forth the conditions and results obtained employing single wafers in the apparatus.

TABLE I

| | Open Chamber Backed | Open Chamber Unbacked | Tunnel Unbacked |
|---|---|---|---|
| Pressure (torr) | 0.1 | 0.1 | 0.5 |
| Power (watts) | 100 | 100 | 150 |
| Time (minutes) | 40 | 15 | 9 |
| Product | Acceptable | Not Acceptable | Excellent |

It is evident from the data in Table I that the present invention is superior to the prior art processes and devices in several respects. The device of this invention may be operated at substantially higher pressures than prior art devices, and it is therefore easier to operate and less time consuming in that high degrees of evacuation are not necessary. The present device also may tolerate higher power which saves time. The etching was effected in the device of this invention in 9 minutes without a backing, whereas it was effected in 40 minutes with a backed wafer in the open chamber. The unbacked wafer in the open chamber had its photoresist destroyed to such an extent that an unacceptable product resulted. In addition to saving time by employing an easier process to effect, the product obtained was an excellent product in that all of the photoresist was intact and no damage could be seen at all so resolution was extremely high. Even the backed wafers in the open chamber showed attack by the plasma so that photoresist near the edges was removed. A great deal of manual effort is required to apply a backing to a wafer.

When the same test was effected in a 6 inch diameter chamber, exactly the same result was obtained in the tunnel; whereas no acceptable product could be obtained from the open chamber.

EXAMPLE 2

The same etching process, employing wafers of the same material and covered with the same photoresist, was effected, but in all cases the chamber was loaded with 25 wafers which were 2 inches in diameter and spaced three-sixteenths inch apart. The Table II below contains the results obtained.

TABLE II

| | Open Chamber Backed | Open Chamber Unbacked | Tunnel Unbacked |
|---|---|---|---|
| Pressure (torr) | 0.1 | 0.1 | 0.5 |
| Power (watts) | 100 | 100 | 150 |
| Time (minutes) | 80 | * — | 29 |
| Product | Acceptable | Not Acceptable | Excellent |

*Photoresist gone in 7 minutes.

The time for etching of the unbacked wafers could not be obtained because within 7 minutes all of the photoresist had been destroyed and sufficient etching had not yet been accomplished. The same test was made in a 6 inch diameter chamber in which approximately the same results were obtained in the tunnel, while no acceptable product could be obtained in the open chamber.

EXAMPLE 3

In Example 3, an 8 inch diameter chamber was employed to etch 5,000 angstrom units of phorphorus-doped glass masked with 5,000 angstrom units of photoresist. Unbacked wafers 2 inches in diameter were employed and the etching process was operated at 150 watts of power and 0.5 torr pressure. Perforated aluminum cylinders in the form of cylindrical screens were employed as the perforated metal cylinder. Cylinders of different diameters were employed, and the results of a series of tests are set forth in Table III below.

TABLE III

| Cylinder Diameter (inches) | Etching Time (minutes) | Product |
|---|---|---|
| 7 | 21 | Excellent |
| 6 | 16 | Excellent |
| 5 | 9.5 | Excellent |
| 4 | 7.5 | Adequate |
| 3 | 4.5 | Not adequate |

The data in Table III suggests that the active species that effect etching are generated in the annular space 9 and pass through perforations 8 so that the wafers being etched are exposed to those active species. However, the perforated cylinder 7 apparently screens those elements of the plasma which cause heat, which in turn makes the photoresist susceptible to destruction by the plasma. The perforated cylinder 7 also apparently screens those radiations and materials that are not productive of etching but rather produce destructive effects on the photoresist. Thus, with a large diameter perforated cylinder, longer etching times are necessary because, apparently, active species must diffuse farther to contact the material being etched. However, when perforated cylinders too small in diameter are employed, some of the destructive materials in the plasma contact the material being etched. The data in Table III indicate that the spacing between the perforated cylinder and the specimen being etched is an important consideration for any given gas pressure and power; and the data indicate that a spacing in excess of one inch between all portions of the specimen being etched and the perforated cylinder is adequate for all ordinary plasma matrials and power levels. No differences could be seen between the product within the 5 inch diameter cylinder and the product within the 7 inch diameter cylinder.

In general, in employing the device of this invention, lower pressures within the plasma-generating chamber tend to increase the penetration within the perforated cylinder of undesirable species that cause bad effects. Since higher pressures increase etching rate and are easier to maintain, the device of this invention is found to function better at more desirable operating conditions, which is opposite to the devices of the prior art wherein higher plasma gas pressures have higher rates of destruction of the resist.

As in the prior art, increased power increases the rate at which the resist is destroyed in the device of this invention. However, in prior art devices there appears to be a linear relationship between power and resist destruction rate; whereas in the device of this invention, increased powers do not increase the rate of resist destruction correspondingly, but rather to a small degree, until "breakthrough" power is attained.

Other generalities are that in all cases the use of a perforated, electrically conductive metal cylinder within the plasma chamber has a beneficial effect on the process of etching without destroying the resist. Specifically, the use of a perforated metal cylinder will always permit higher etching rates than without, in a given plasma system. However, if the spacing between the material being etched and the perforated metal cylinder is too close, this beneficial effect will be diminished.

In addition to the experiments reported in the examples, a number of experiments were performed in the device of this invention which accomplished what could not be accomplished in prior art devices under any circumstances. In one such experiment, a layer of 6,000 angstrom units of thermal silicon oxide was etched from a specimen which was protected with a layer of resist 6,000 angstrom units thick. Since the thermal oxide is so difficult to etch, in devices of the prior art this process could not be accomplished. However, employing the perforated metal cylinder of the device of this invention, it was accomplished in about 60 minutes; and after the etching was completed, the photoresist was found to be in excellent condition. In fact, resolution was such that lines one micron wide were etched in the oxide.

In another experiment 25 wafers 3 inches in diameter and having a surface of phorphorus-doped glass were etched through 6,000 angstrom units of glass employing a thickness of only 6,000 angstrom units of photoresist. Again, the photoresist was in excellent condition and produced a product with high resolution in less than 40 minutes. The same experiment performed with 2 inch diameter wafers produced the same result in less than 30 minutes.

Silicon nitride specimens were etched through 2,000 angstrom units of silicon nitride in less than 5 minutes with absolutely no attack on the photoresist.

Although this invention is described with reference to a process for etching, it is applicable to other processes where surfaces are treated with active chemical species produced in plasma. Known treatments of plastics, metals, or other materials to produce desirable surface characteristics may be accomplished more rapidly and without unwanted side effects when these treatments are effected in the device of this invention.

What is claimed is:

1. A plasma etching device comprising a nonmetallic, inorganic cylinder having an end wall and an opposing front opening, a plurality of electrodes surrounding said inorganic cylinder and connected to a source of radio frequency energy, a perforated cylinder of electrically conductive metal within, concentric to, and spaced from the wall of said inorganic cylinder, said perforated metal cylinder being large enough in diameter to contain within it the material to be etched.

2. The device of claim 1 wherein said perforated metal cylinder is aluminum.

3. The device of claim 1 wherein external means are provided to heat the material to be etched.

4. The device of claim 3 wherein said means is an infrared generating device.

5. The device of claim 1 wherein said nonmetallic cylinder is quartz.

6. The device of claim 1 wherein said perforated cylinder is spaced at least one inch from any portion of the material being etched.

* * * * *